Feb. 7, 1956  W. P. FERGNANI  2,733,643
BOX BLANK FOLDING MACHINE
Filed March 15, 1952  12 Sheets-Sheet 1
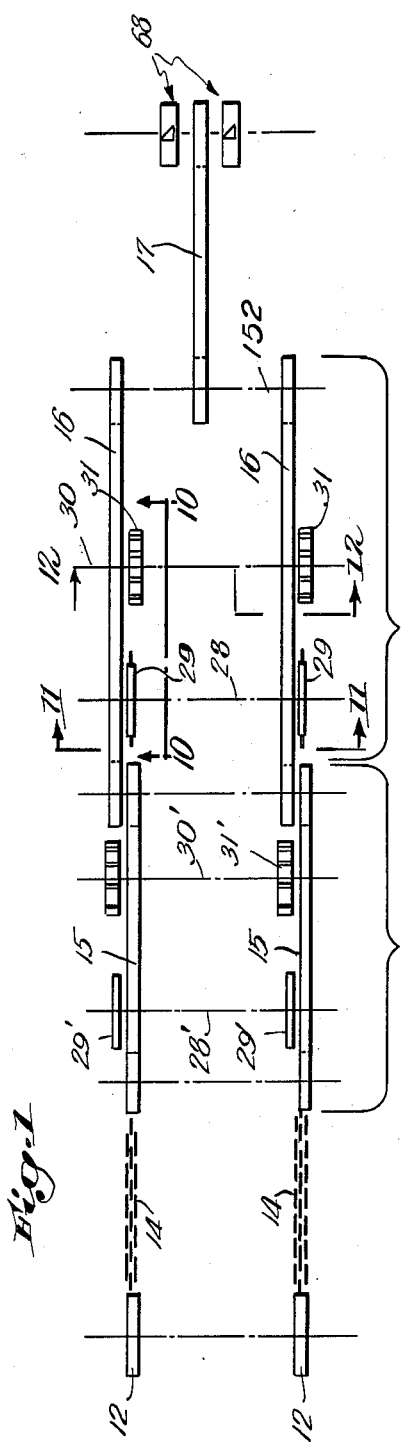
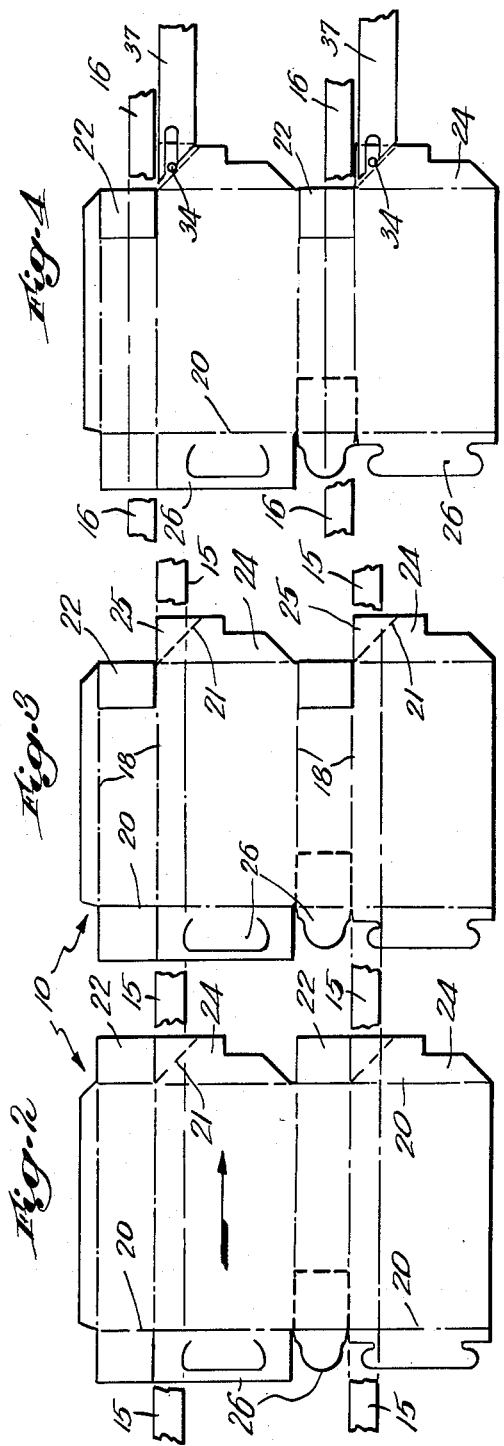
Inventor
Walter P. Fergnani
By Kenway, Jenney, Witter & Hildreth
Attys.

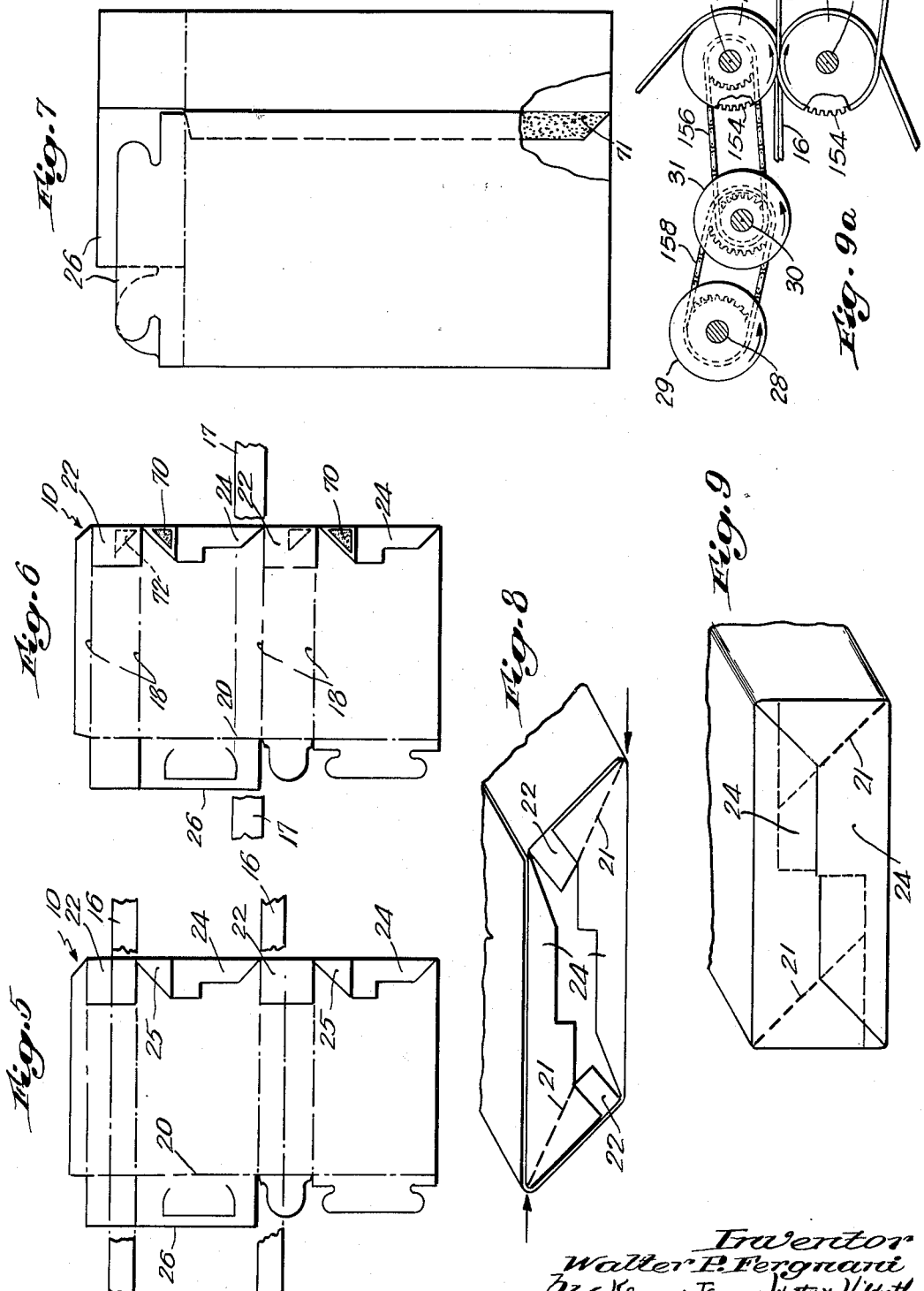

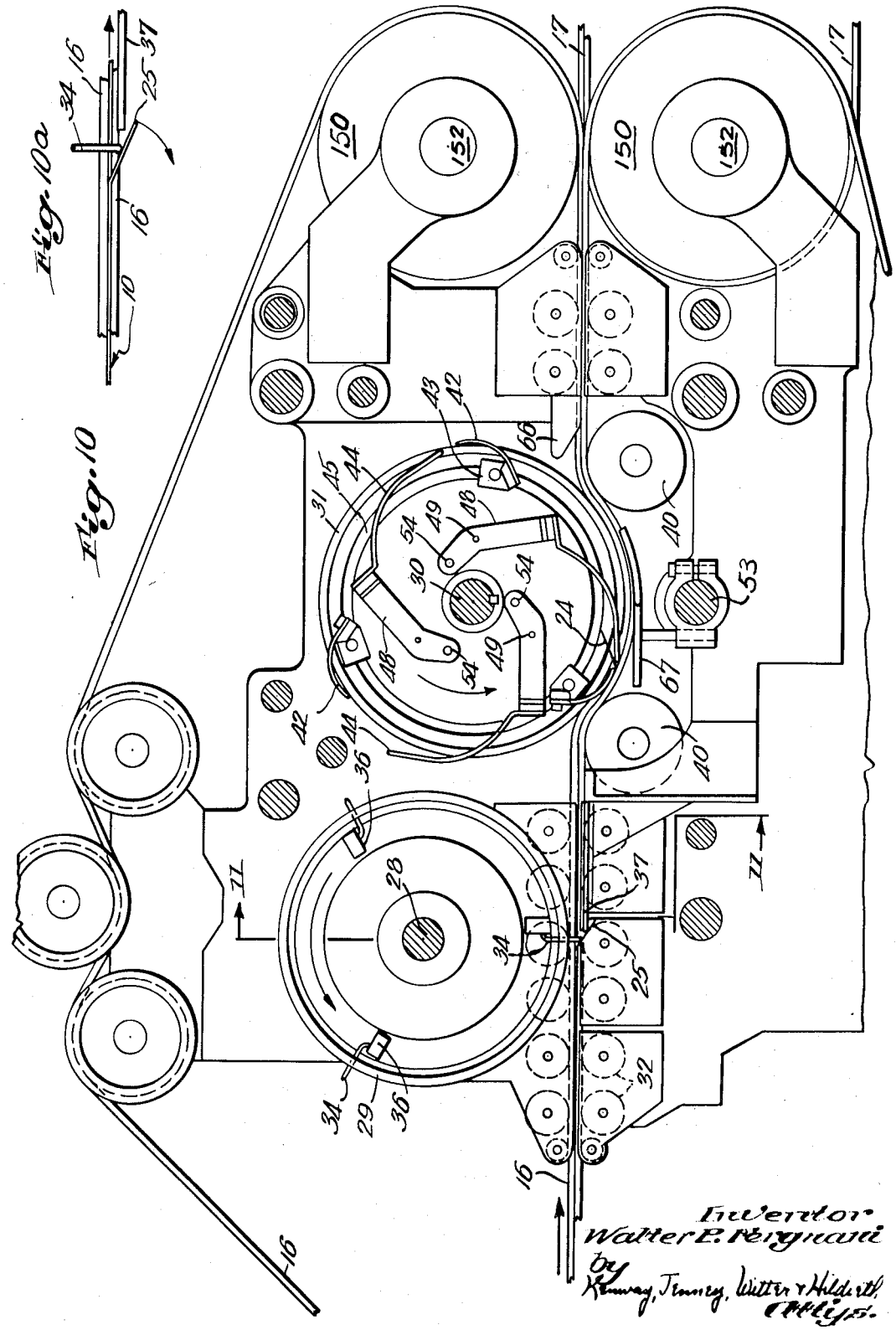

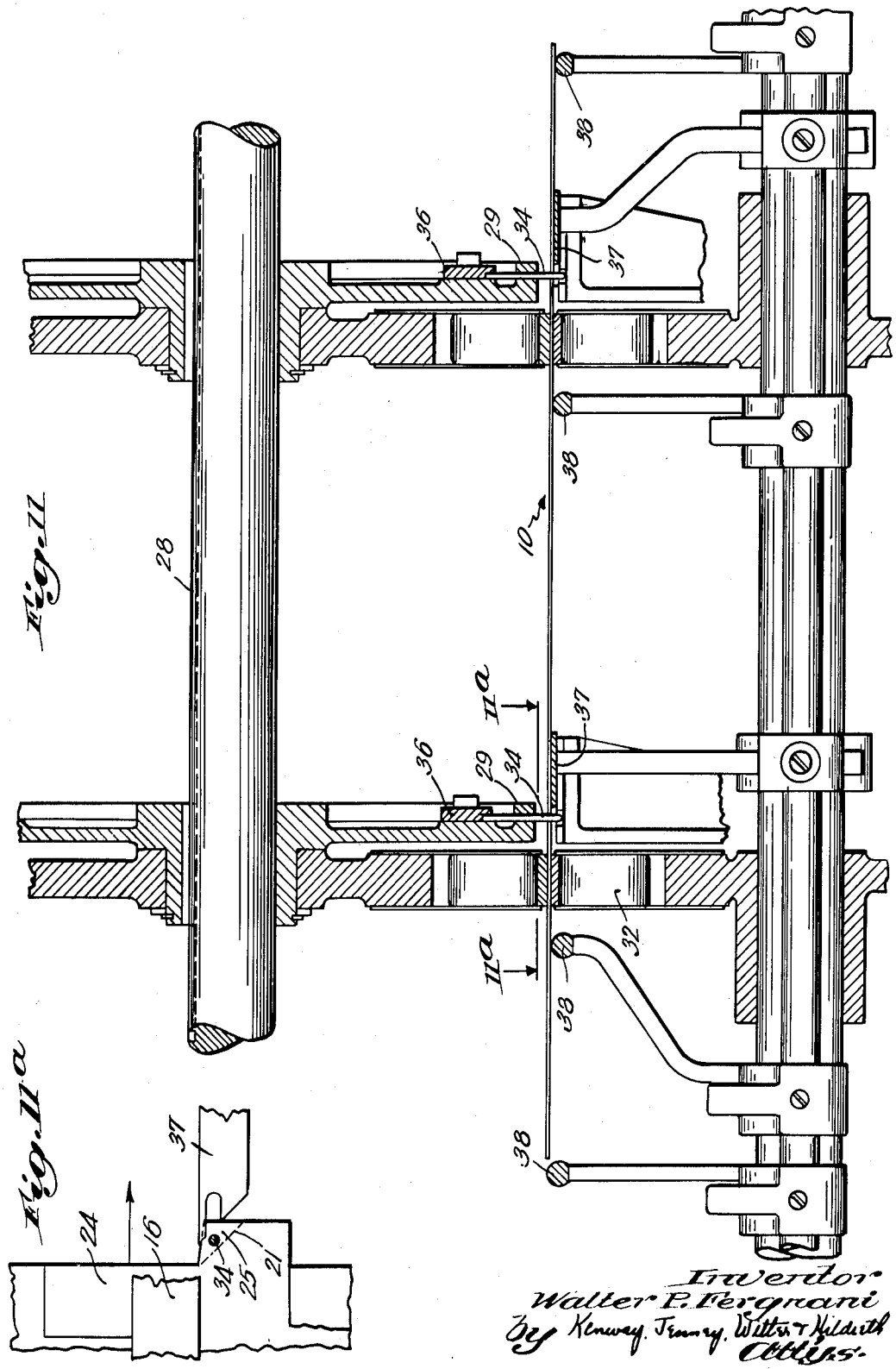

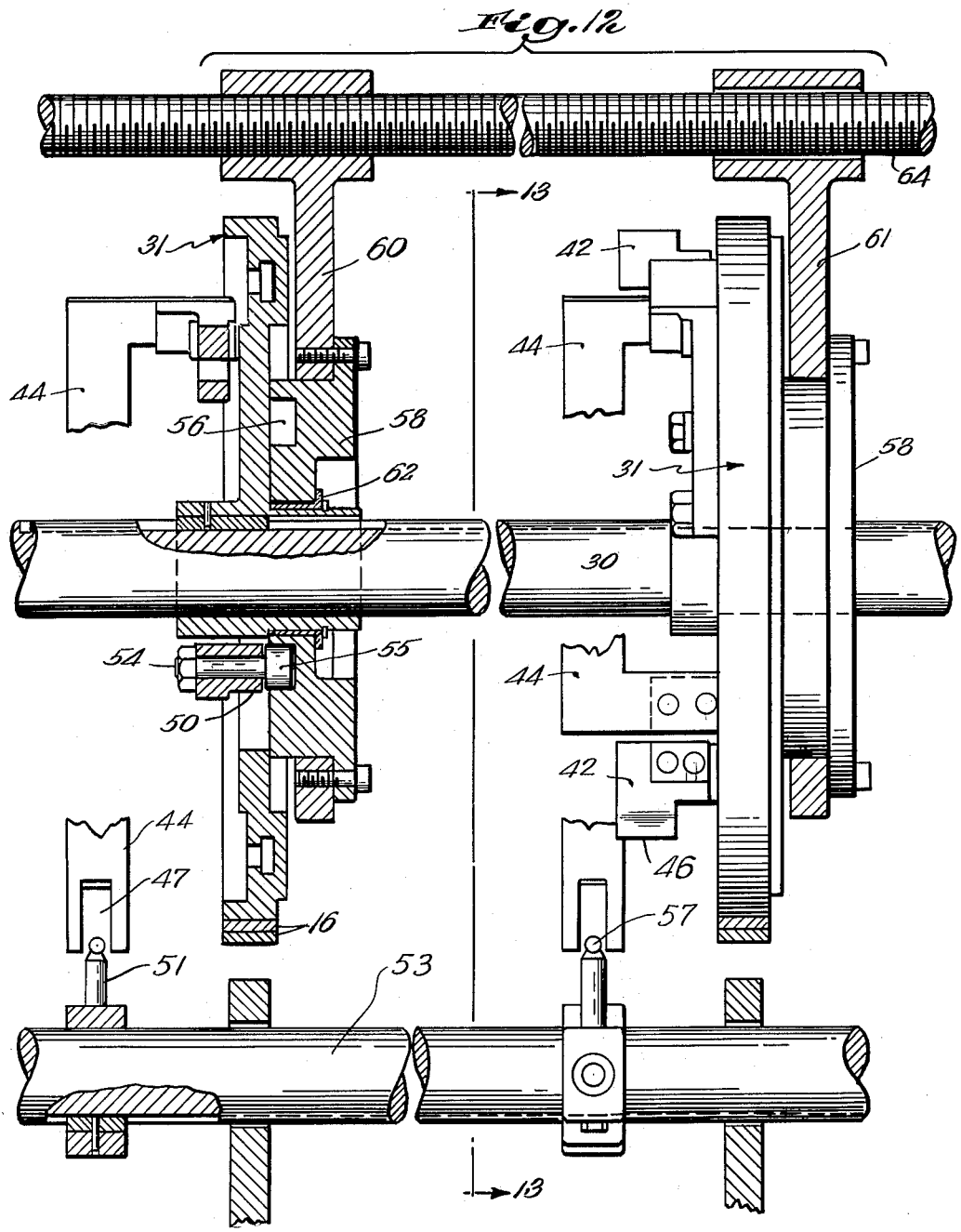

Feb. 7, 1956 W. P. FERGNANI 2,733,643
BOX BLANK FOLDING MACHINE
Filed March 15, 1952 12 Sheets-Sheet 6
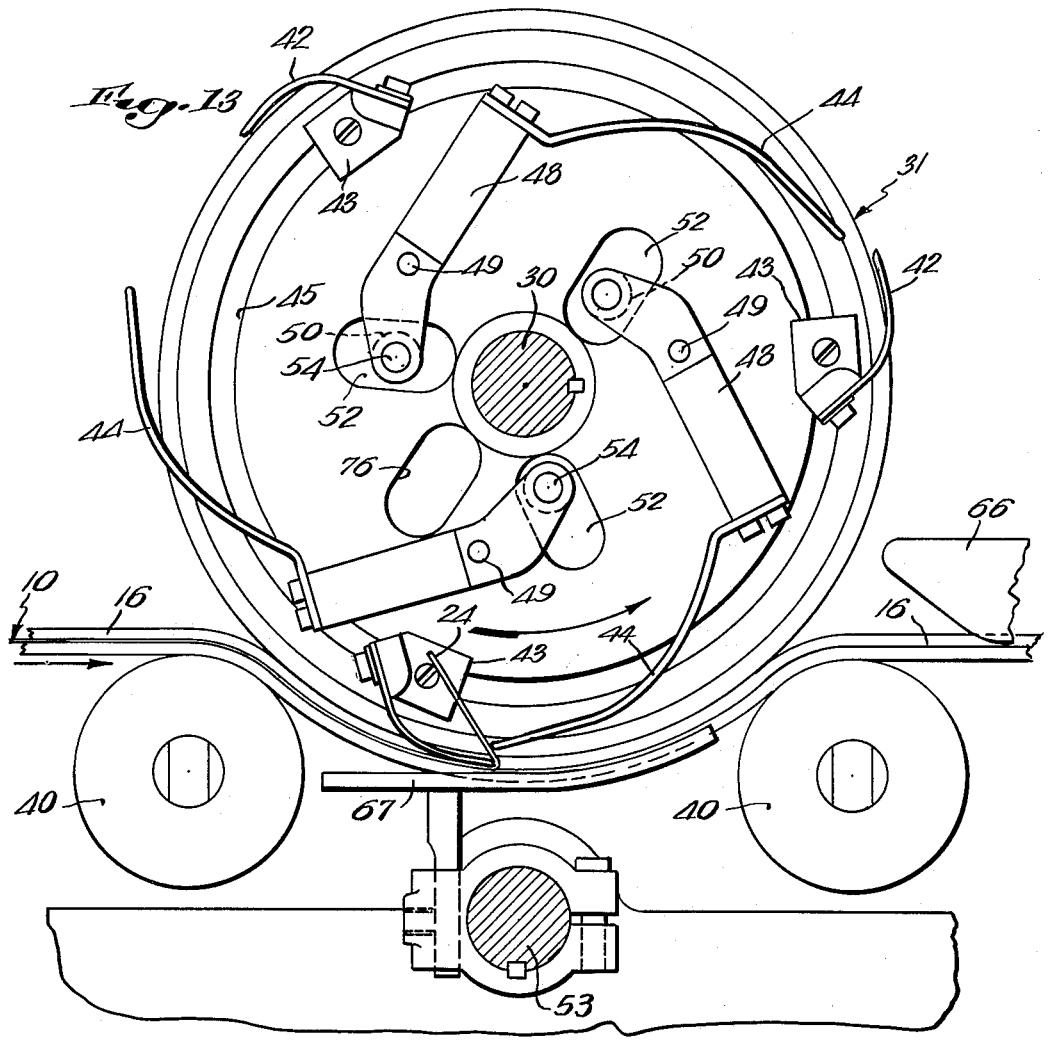
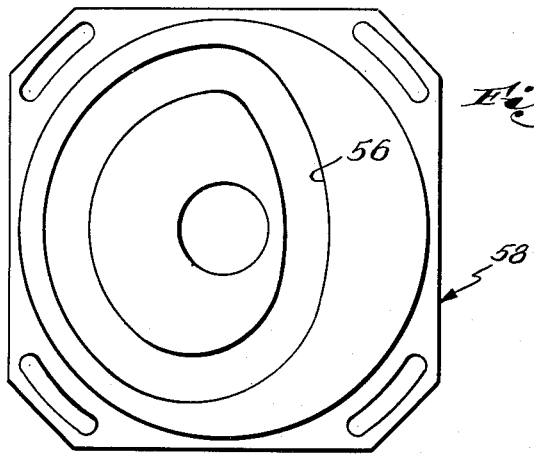
Inventor
Walter P. Fergnani
by Kenway, Jenney, Witter & Hildreth
Attys.

Feb. 7, 1956   W. P. FERGNANI   2,733,643
BOX BLANK FOLDING MACHINE
Filed March 15, 1952   12 Sheets-Sheet 7
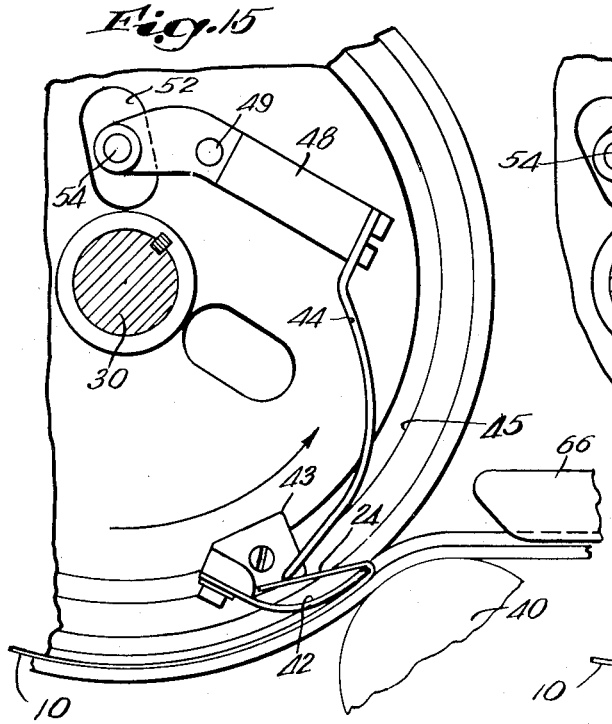
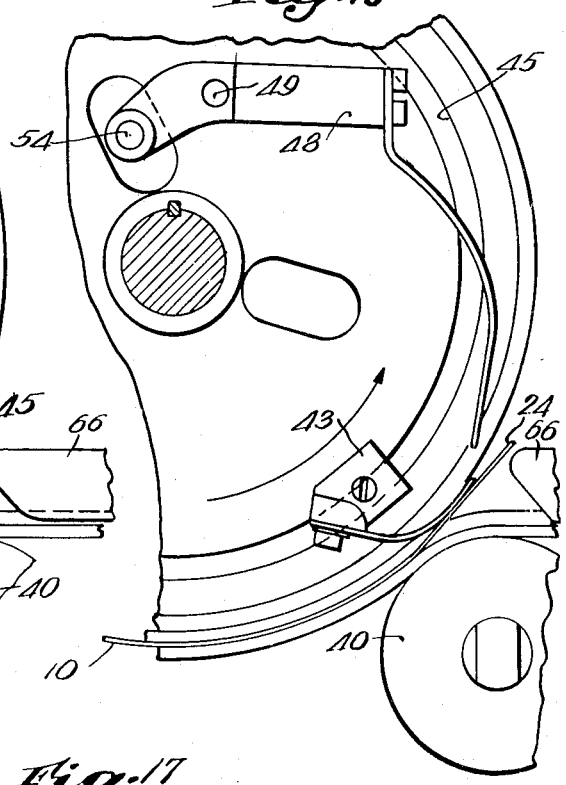
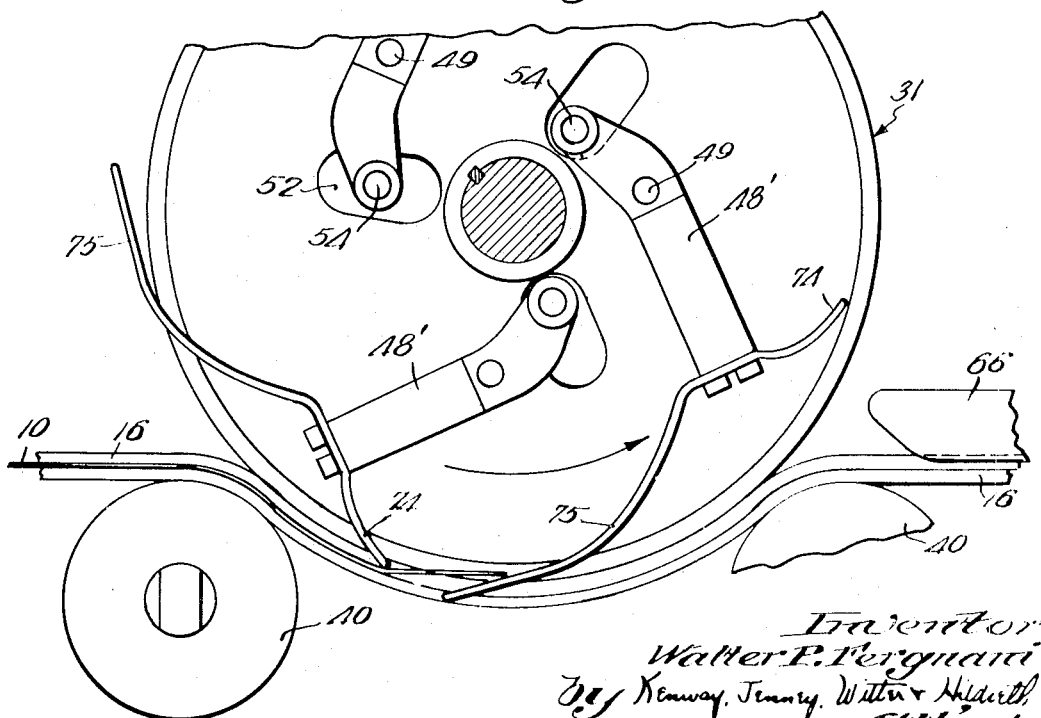

Feb. 7, 1956 W. P. FERGNANI 2,733,643
BOX BLANK FOLDING MACHINE
Filed March 15, 1952 12 Sheets-Sheet 8
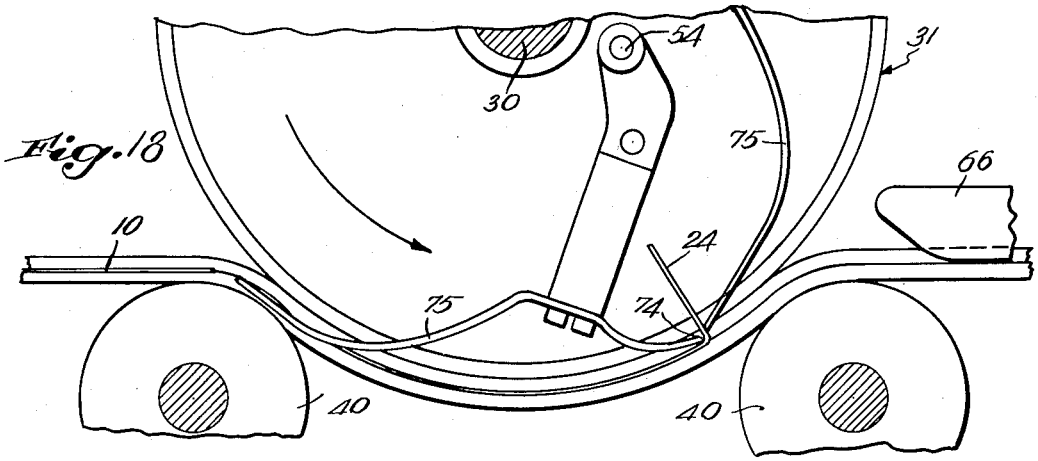
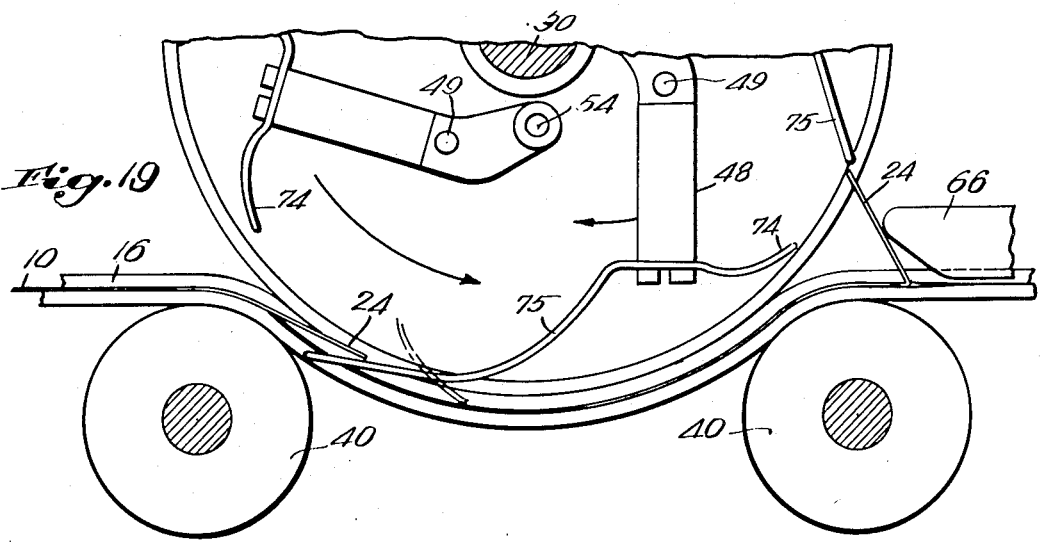
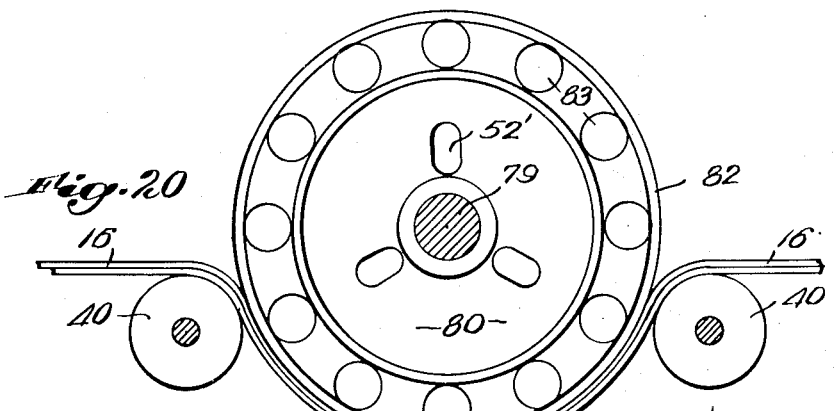

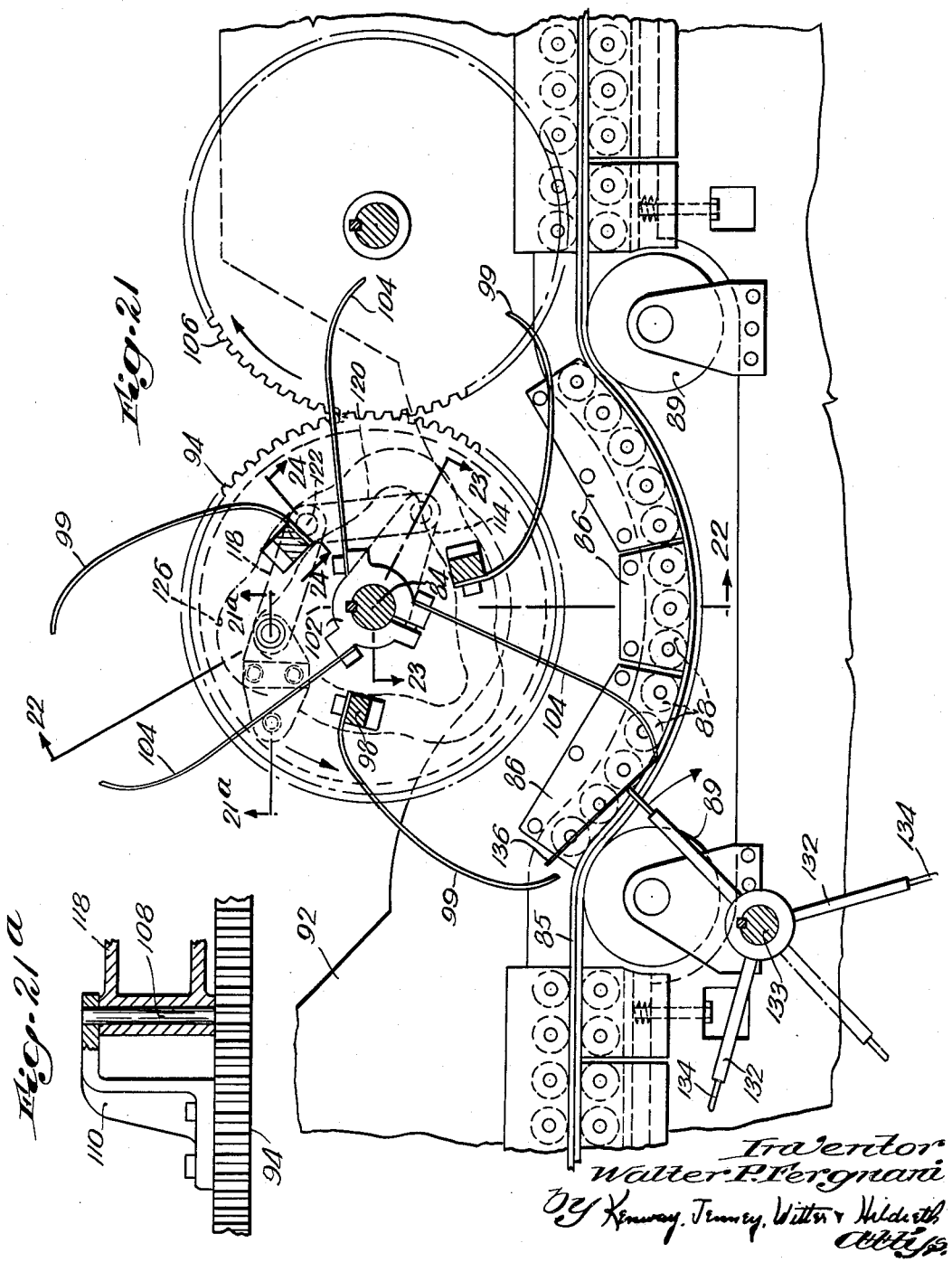

Feb. 7, 1956  W. P. FERGNANI  2,733,643
BOX BLANK FOLDING MACHINE
Filed March 15, 1952  12 Sheets-Sheet 10
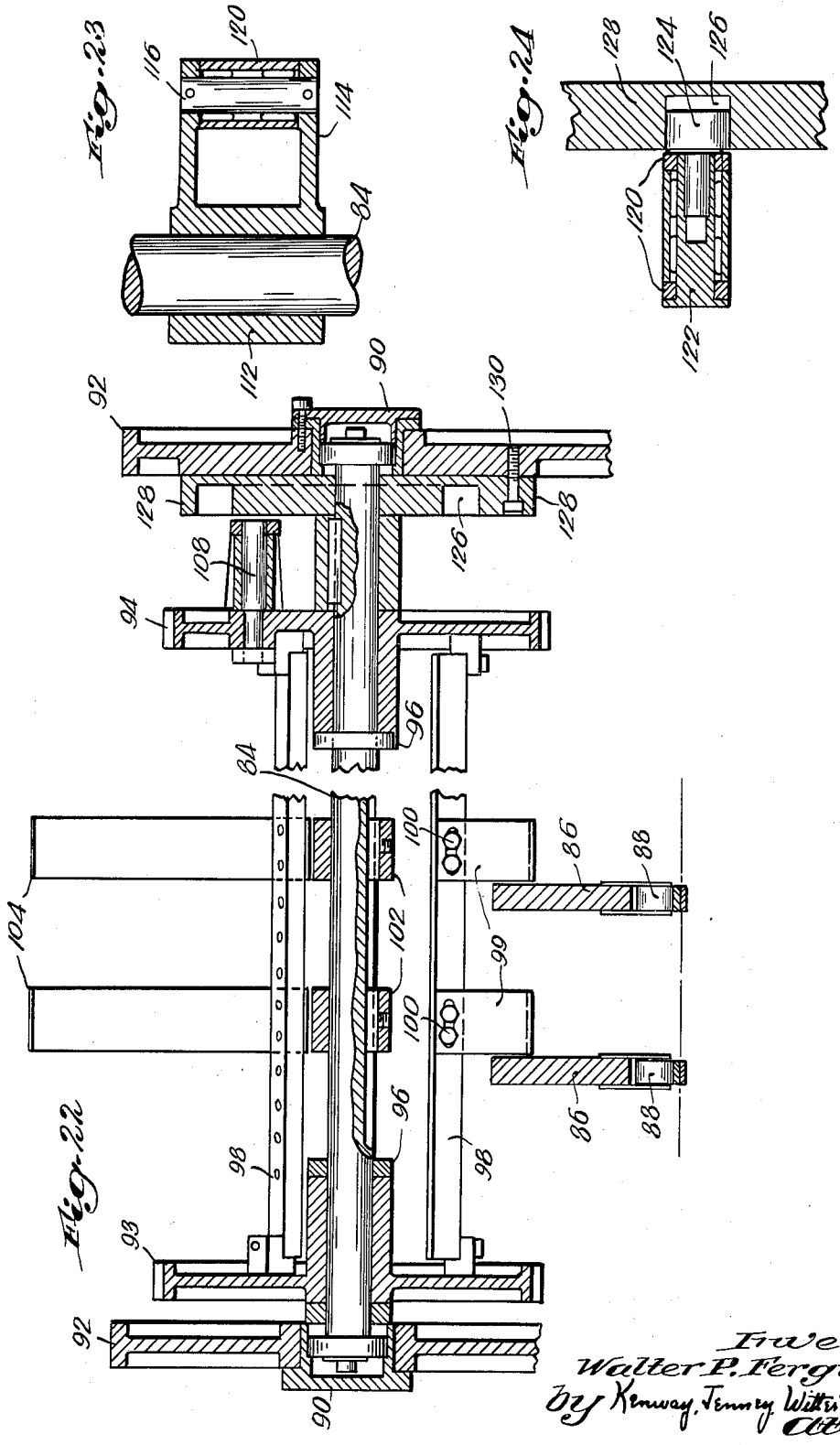
Inventor
Walter P. Fergnani
By Kenway, Jenney, Witter & Hildreth
Attys.

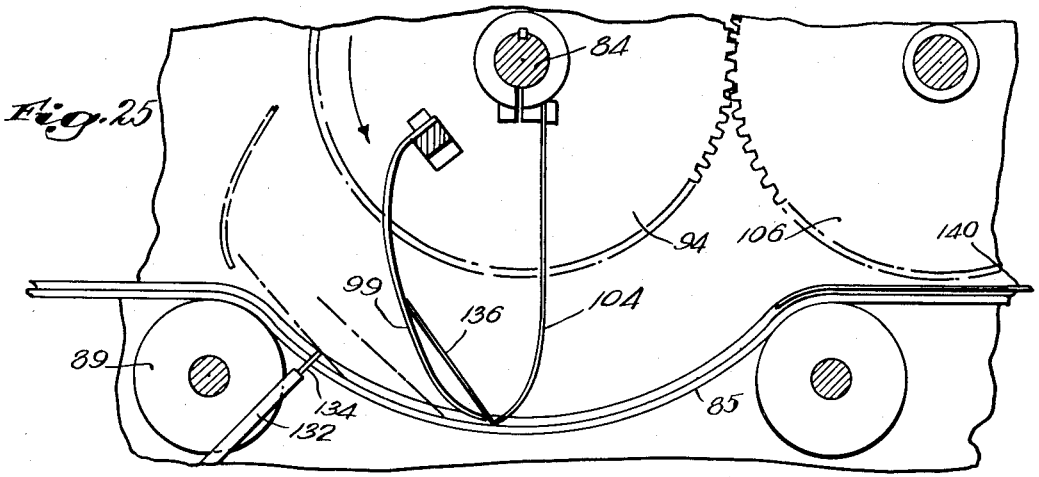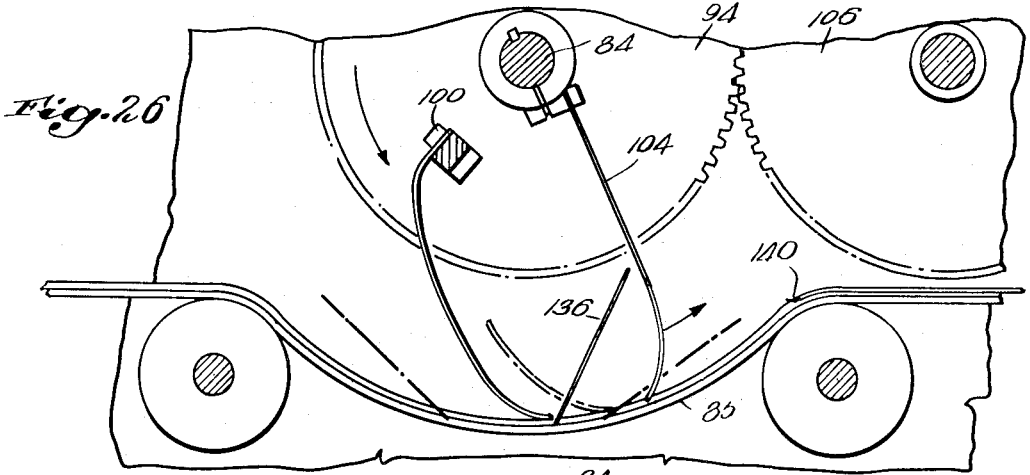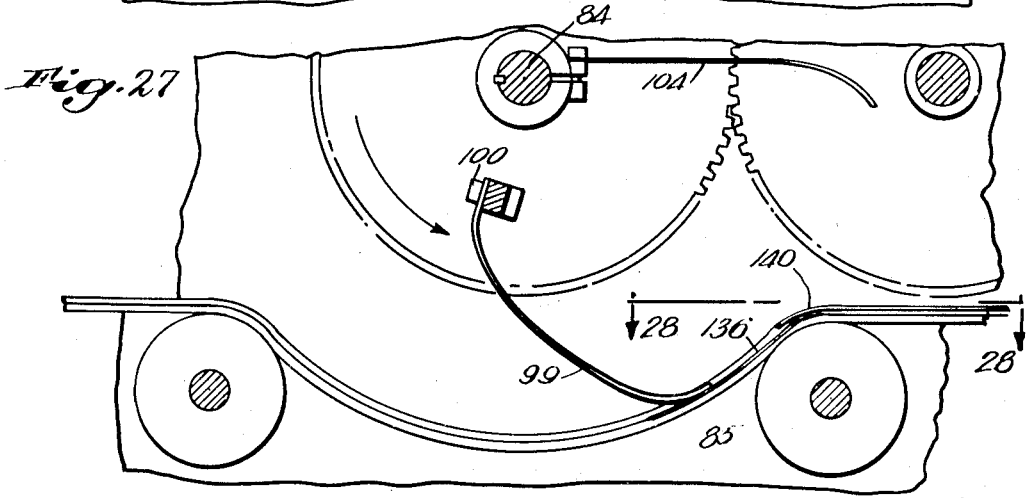

Feb. 7, 1956 W. P. FERGNANI 2,733,643
BOX BLANK FOLDING MACHINE
Filed March 15, 1952 12 Sheets-Sheet 12
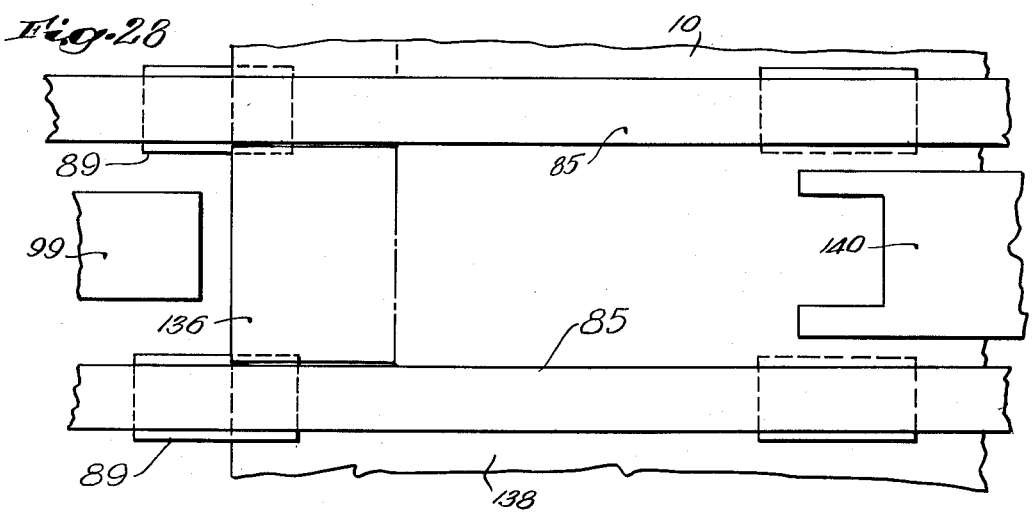
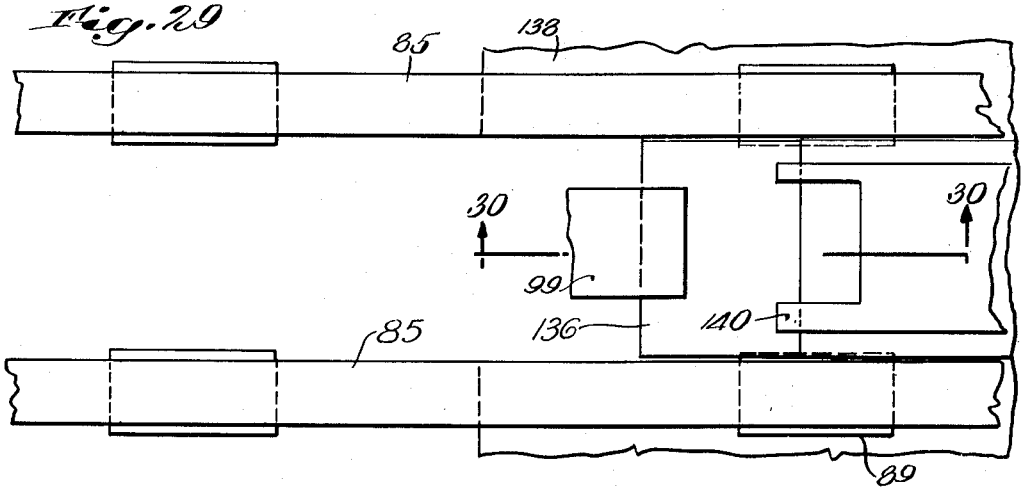
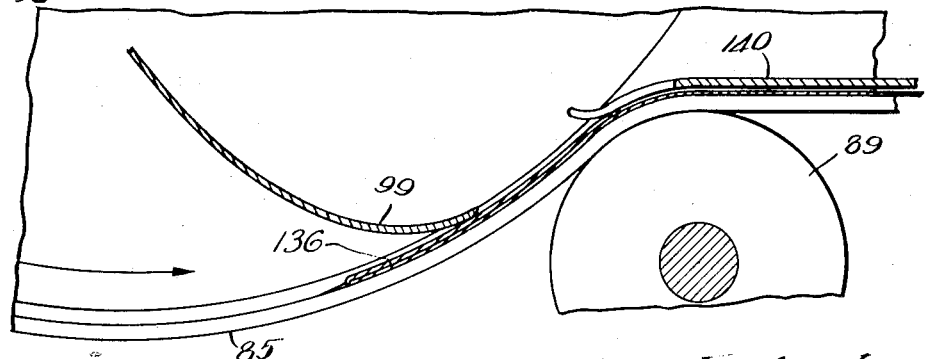
Inventor
Walter P. Fergnani
By Kenway, Jenney, Witter & Hildreth
Attys.

United States Patent Office 2,733,643
Patented Feb. 7, 1956

2,733,643

BOX BLANK FOLDING MACHINE

Walter P. Fergnani, Beverly, Mass., assignor to Post Machinery Company, Beverly, Mass., a corporation of Massachusetts Application March 15, 1952, Serial No. 276,819

18 Claims. (Cl. 93—49)

This invention relates to a machine for feeding flat box blanks along a predetermined path and folding the blanks into overlapped and sealed relation during their passage through the machine. Blank folding machines of this type have heretofore commonly folded into overlapping relation flaps and the like projecting laterally from the blanks, and the folding of flaps or blank portions projecting forwardly and rearwardly of the blanks has required transferring of the blanks to other mechanisms adapted to move them along a second and relatively right angular path from which the portions to be folded will then project laterally. My present invention relates to an improved machine for also folding flaps and the like that project forwardly and rearwardly of the blanks, thereby making possible the entire folding operation along one straight path and eliminating the necessity of transferring the blanks to a relatively right angular path. The production of an improved machine for performing this function comprises the primary object of the invention.

My improved machine includes a shaft extending transversely across the blank feeding path and carrying one or more breaker blades and cooperating folding blades together with mechanism for so bringing the blades into contact with the blanks that the forwardly and rearwardly projecting flaps and the like are folded over and onto the blanks during their passage through the machine and past the shaft.

The folding operation is facilitated by disposing a portion of the blank feeding path arcuately about the shaft and performing the folding operation in this arcuate portion of the path. The folding of relatively large flaps is also facilitated by novel cam operated mechanism adapted to give relative movements to the breaker and folding blades to perform the folding operation and thereafter retract the blades. A further feature of the invention embodies a second shaft carrying abutments for engaging and pre-locating certain flaps in position to be engaged by the breaker and folding blades, all as hereinafter more specifically described. The production of a novel machine for performing these functions comprises a further object of the invention.

These and other features of the invention will be best understood and appreciated from the following description of preferred embodiments thereof selected for purposes of illustration and shown in the accompanying drawings in which—

Fig. 1 is a fragmentary and schematic plan view of a machine embodying my invention, Figs. 2 to 6 inclusive are plan views of a blank in process of being folded by passage through the machine, Fig. 7 is an elevation of the fully folded and sealed blank, Fig. 8 is a fragmentary bottom end perspective view of the blank being opened to box form, Fig. 9 is a fragmentary bottom end perspective view of the fully opened box, Fig. 9$^a$ is a fragmentary view illustrating the synchronous drive employed in the machine, Fig. 10 is a fragmentary elevation of the machine, taken on line 10—10 of Fig. 1, Fig. 10$^a$ is a fragmentary view of Fig. 10, Fig. 11 is a vertical section taken on line 11—11 of Fig. 1, Fig. 11$^a$ is a fragmentary view taken on line 11$^a$—11$^a$ of Fig. 11, Fig. 12 is a vertical section taken on line 12—12 of Fig. 1, Fig. 13 is a fragmentary vertical section taken on line 13—13 of Fig. 12, Fig. 14 is a face view of a fixed cam shown in Fig. 12, Figs. 15 and 16 are fragmentary views corresponding to Fig. 13 and illustrating two further progressive positions of the flap folding mechanism, Fig. 17 is a like view of a modified construction, Figs. 18 and 19 are fragmentary views corresponding to Fig. 17 and illustrating two further progressive positions of this flap folding mechanism, Fig. 20 is a fragmentary view corresponding to Fig. 13 and showing a modified construction, Fig. 21 is a fragmentary view corresponding to Fig. 10, but showing a modified construction adapted to fold trailing flaps on the blanks, Fig. 21$^a$ is a fragmentary view taken on line 21$^a$—21$^a$ of Fig. 21, Fig. 22 is a sectional view taken on lines 22—22 of Fig. 21, Fig. 23 is a fragmentary view taken on line 23—23 of Fig. 21, Fig. 24 is a fragmentary view taken on line 24—24 of Fig. 21, Figs. 25–27 are fragmentary views illustrating three further progressive positions of this flap folding mechanism following the position illustrated in Fig. 21, Fig. 28 is a fragmentary plan view of the blank being folded in Figs. 21–27, Fig. 29 is a like view showing a further progressive position of the blank folding operation, and Fig. 30 is a fragmentary view taken on line 30—30 of Fig. 29.

Flat blanks 10 to be folded are fed successively from a magazine to blank feeding wheels 12 which in cooperation with chains 14 feed the blanks synchronously to two pairs of carrier belts 15. Each pair of belts 15 comprises two endless belts having co-engaging reaches adapted to engage and support the blanks therebetween and carry them along a predetermined path through the machine during which certain folding operations are effected. At their forward ends the belts 15 transfer the blanks to like carrier belts 16 (Fig. 10) disposed somewhat laterally of the belts 15. The belts 16 thereupon continue the movement of the blanks along a further portion of the path during which further folding operations are effected, all as hereinafter described. Belts 17 thereupon receive the blanks and transfer them to gluing mechanism at 68.

Each blank 10 is scored longitudinally along lines 18 and is folded on these lines by mechanism shown in my copending application Serial No. 244,319, filed August 30, 1951, now Patent No. 2,701,990 dated February 15, 1955. The blanks are also scored transversely along lines 20 and stagger cut diagonally along lines 21 and the mechanism disclosed herein is adapted to fold the blanks on these lines during their passage along said path through the machine. The forward score 20 provides two forwardly extending flaps 22 and two forwardly extending flaps 24 and the cuts at 21 provide a foldable tab 25 projecting from each flap 24. The rear score 20 provides rearwardly extending trailing flaps at 26.

Disposed transversely across the carrier belts 16 and above the blank feeding path are two shafts 28 and 30, and two like shafts 28' and 30' are disposed in like manner transversely of the belts 15. Each shaft 28 carries two pin wheels 29 adjacent to and at one side of the belts 16 and each shaft 30 carries two wheels 31 adjacent to and at the same side of the belts. The shafts 28' and 30' carry wheels 29' and 31' in like manner at the other side of its belts 15. The wheels 31' together with mechanism hereinafter described in association with the wheels 31 function first on the blank to fold the flaps 22 from the position of Fig. 2 to the position of Fig. 3, it being noted that the blanks are at this time supported by the belts 15 adjacent to the flaps 22.

The forward loops of the belts 16 and the rear loops of the belts 17 are supported on rollers 150 fixed to shafts 152 connected by gears 154. One of these shafts is driven by a suitable power means. A chain 156 together with sprockets provides a power drive from the shaft 152 to the shaft 30 and a like chain 158 with sprockets connects the shafts 30 and 28. The shafts 28' and 30' are driven in like manner.

The blanks folded as in Fig. 3, pass from the belts 15 to the belts 16 which thereupon engage the blanks over the folded flaps 22 and adjacent to the flaps 24. The blanks are thereupon passed along a straight path beneath the pin wheels 29, the belts at this portion of the path being supported by a series of rolls 32 disposed along the path. Each pin wheel 29, as illustrated in Figs. 10 and 11, carries a plurality of pins 34 extending outwardly in uniformly spaced relation about the wheel and secured thereto by clamps 36. The function of these pins is to engage and force the tabs 25 downwardly, thus prebreaking the blank along the cut lines 21 as illustrated in Figs. 4 and 11ª. Vertically adjustable plows 37 and guide rods 38 beneath the blank path and adjacent to the wheels 29 aid in supporting the blank in horizontal position during this operation. The downwardly bent tabs 25 of the moving blank thereupon engage the plows 37 which complete folding of the tabs on the lines 21.

The blanks then pass beneath the shafts 30 where the flaps 24 are folded by mechanism carried by the wheels 31. A lowermost arcuate peripheral portion of each wheel 31 engages and supports its adjacent belt 16, two rolls 40 engaging the lower companion belt and cooperating with the wheel to support the belts in an arcuate path disposed about the shaft 30. Three cooperating pairs of breaker blades 42 and folding blades 44 are carried by each wheel in uniformly spaced relation about the shaft 30. Each breaker blade 42 is supported on a clamping block 43 adjustable in a T-slot 45 in the wheel and disposed about the shaft 30. Each breaker blade terminates slightly beyond the periphery of the wheel in a straight edge 46 adapted to engage and hold the blank at the crease line 20 while the flap 24 is folded thereover.

Since the blades for performing the folding operation are carried by the shaft 30, the folding must be performed while the blank is disposed a radial distance from the shaft equal to or slightly greater than the blank engaging ends of the blades. An important feature of my invention includes the arcuate portion of the blank feeding path beneath the shaft 30 as shown in Fig. 10 whereby the blank is held at this radial distance during its passage through this portion of the path, thereby substantially increasing the time period during which the folding operation can be performed.

Each folding blade 44 is mounted on the outer end of an arm 48 pivoted to the wheel 31 at 49. The other end of each arm carries a laterally disposed boss 50 extending into an opening 52 through the wheel (Figs. 12 and 13). A pin 54 extending through the boss 50 and opening 52 carries a roll 55 disposed within a cam groove 56 in a cam plate 58. One cam plate 58 is fixed to a vertically disposed and laterally adjustable plate 60 of the machine frame and the other cam plate is fixed to a like plate 61 (Fig. 12). Each wheel 31 is splined to the shaft 30 and is rotatable within its cam on a bearing 62 disposed therebetween. Rotation of a rod 64 in threaded engagement with the plate 60 is adapted to adjust the plate 60 and its wheel 31 along the shaft and a like threaded rod is provided for adjusting the plate 61 laterally in like manner.

The mechanism thus far described is adapted to operate on three blanks during each rotation of the shafts 28, 28', 30 and 30', the shafts being rotated synchronously with the movement of the belts 15 and 16. The wheels 29' and 31' are adapted to function in like manner as the wheels 29 and 31. However, since the flaps 22 have no tabs corresponding to the tabs 25, no pins corresponding to the pins 34 are provided on the wheels 29'. The wheels 31' function to fold the flaps 22 to the position shown in Fig. 3 in like manner as the wheels 31, which function will now be described.

Referring now to Figs. 10–16 of the drawings, as the blank shown in Fig. 3 passes beneath the wheel 29 a pin 34 comes into contact with the tab 25 and flexes it downwardly on the line 21 as shown in Figs. 4, 11 and 11ª. Continued movement of the blank then causes the downwardly flexed tab to pass over the plow 37 which thereupon folds the tab on the line 21. The blank then continues on beneath the wheel 31 wherein a breaker blade 42 engages the blank rearwardly of each flap 24 while the cooperating folding blade 44, through movement given by the cam 56, folds the flap. The breaker blade engages the blank at the rear end of the arcuate portion of the path and, as the blank and breaker blade move forwardly through this portion of the path, the folding blade is moved rearwardly to fold the flap as shown in Figs. 10, 13 and 15. The folding blade is thereafter quickly retracted (Fig. 16) and continued movement of the breaker blade 42 causes it to open the flap and escape therefrom as shown in Fig. 16. The flap is refolded as it engages and passes beneath the plow 66. Vertically adjustable supports 67 on a rod 53 are provided for the blank beneath the arcuate portion of the path.

The blank with the flaps 22 and 24 and tabs 25 folded to the position shown in Fig. 5 is now passed further along the path by belts 17 to a gluing mechanism 68 (Fig. 1) where adhesive 70 is applied to the tabs 25 (Fig. 6). The blank is thereafter folded on the lines 18 and sealed along the flap 71 to form the flat folded blank shown in Fig. 7. In this blank, commonly termed a "lock box," the flaps 26 are at the top of the box and are adapted to be folded to interlocked and box closing position after the box is filled. When the blank (Fig. 6) is folded to the position shown in Fig. 7, the adhesive spots 70 engage the flaps 22 at 72 and form the end walls of the box. The blanks are shipped in the form shown in Fig. 7 and when opened (Fig. 8) to box form (Fig. 9) the interlocking flaps 22 and 24 automatically cooperate to form the bottom of the box.

In Figs. 17–19 I have illustrated a modified construction in which a breaker blade 74 and a folding blade 75 are mounted on the free end of each pivoted arm 48', both blades preferably being in one piece and extending in opposite directions from the arm. As illustrated in Fig. 17, a breaker blade 74 on one arm is adapted to engage and hold the blank while the adjacent folding blade 75 on the adjacent arm moves in the manner illustrated in Figs. 17 and 18 to fold the flap 24. The folding blade is thereafter rapidly retracted as shown in Fig. 19 while the next adjacent folding blade engages beneath the flap 24 next to be folded. It will be understood that a cam like the cam 58 provided with a cam groove 56 of the necessary contour is employed for giving the required movements to the arms and blades.

While in Figs. 10–19 I have illustrated mechanism for operating on three blanks at each rotation of the shafts 28 and 30, it will be understood that the mechanism can be constructed to operate on one or a plurality of blanks at each such rotation. When two blanks are to be folded at each rotation of the shaft 30, two pivoted arms 48 will be disposed at opposite sides of the shaft, an oppositely disposed opening 76 being provided in the wheel 31 (Fig. 13) for this purpose. It will also be noted that each folding blade 44 is recessed at 47 (Fig. 12) to provide clearance for posts 51 supported on rods 53. The posts carry blank supporting rods 57 extending longitudinally of the machine.

The arcuate portion of the blank feeding path disposed about the shaft 30 must be of sufficient length to permit the folding function. Small flaps can be quickly folded and therefore require a relatively small length of the path whereas longer flaps fold more slowly and therefore require a greater length of the path. In Fig. 20, I have illustrated a modified construction for increasing this arcuate length of the path. The shaft 79 corresponds to the shaft 30 and carries a wheel 80 corresponding to the wheel 31 and provided with suitable breaker and folding blades. An annulus 82 supported by rollers 83 for free rotation on and coaxial with the wheel is in peripheral supporting contact with the belts 16. Thus the annulus increases the length of the arcuate path and provides additional time for folding the flaps. It will be understood that the breaker and folding blades will be of a length to engage the blanks along the arcuate portion of the path.

While the "lock box" blank 10 does not require folding of the trailing flaps 26, other boxes may require such folding operation and in Figs. 21–30 I have illustrated mechanism for performing this function. This mechanism will now be described.

In Fig. 21 a shaft 84, corresponding to the shaft 30, extends transversely over the blank feeding belts 85 which correspond to the belts 15 and 16. A plurality of fixed roller cages 86 each supporting a plurality of rollers 88 in contact with the top belt are employed, in conjunction with two rollers 89 supporting the bottom belt, for maintaining the belts in an arcuate path about the shaft. The shaft 84 is rotatably supported at its ends in bearings 90 in the side frames 92 of the machine. Two gears 93 and 94 are mounted in spaced relation and have free rotation on the shaft and are held against inward movement along the shaft by collars 96 fixed to the shaft. Three uniformly spaced and parallel bars 98 are rigidly fixed at their ends to the gears 93 and 94 and two folding blades 99 are mounted on each bar. The blades are adjustable along the bars and secured thereto by clamping bolts 100. Two spiders 102 are keyed to the shaft in the plane of the folding blades and each spider carries three breaker blades 104 each disposed between the two adjacent folding blades.

The two gears 93 and 94 on the shaft 84 are rigidly united by the bars 98 to rotate as a unit and are driven by a gear 106 in mesh with the gear 94. The gear 94 is connected to the shaft by toggle mechanism which will now be described. A stud 108 extends outwardly from the gear 94 and is rigidly supported by a bracket 110 bolted to the gear. A boss 112 keyed to the shaft 84 has an arm 114 extending outwardly therefrom and carrying a pin 116. The stud 108 and pin 116 are connected by toggle mechanism (Fig. 21) comprising two links 118 and 120 respectively connected at their outer ends to the stud and pin and pivoted together at their inner ends on a stud 122. The stud 122 carries a cam follower 124 engaging within a cam path 126 in a cam plate 128 fixed to the adjacent frame 92 by bolts 130. By reference to Fig. 21 it will be noted that the cam path 126 has three symmetrical portions corresponding in number to the three pairs of folding and breaker blades. Each of these cam portions is adapted to move the stud 122 radially inward and outward and thereby rotate the shaft 84 relative to the gears 93 and 94 as and for the purpose hereinafter described.

When operating on trailing flaps it is necessary to raise the flaps to a position to be engaged by the folding blades 99. Mechanism comprising arms 132 extending radially from a shaft 133 is provided for this purpose. Pins 134 carried at the free ends of the arms are adapted to raise the flaps 136 to the position illustrated in Fig. 21 wherein the advancing folding blades 99 will engage the raised flaps.

The mechanism shown in Figs. 21–27 functions as follows to fold the trailing flap 136 of the fragmentary portion of blank 138 shown in Figs. 28–30. The belts 85 feed the blank in the direction of the arrows and through the arcuate path about the shaft 84. Each breaker blade 104 engages the blank at its junction with a flap 136 and holds the blank while one of the pins 134 lifts the flap to the position of Fig. 21 and a folding blade 99 folds the flap forwardly in the manner illustrated in Figs. 25–27.

The folding blades 99 carried by the bars 98 have a uniform motion with the gears 93 and 94 driven by the gear 106. This rotary motion is synchronized with the movement of the belts 85 and is such that the flap engaging portions of the blades 99 move forwardly through the arcuate path somewhat faster than the blank and thereby fold the flaps 136 in the manner shown in Figs. 21, 25 and 26. The cam path 126 is designed to move each breaker blade 104 to the position of Fig. 21 in the arcuate path and hold it thus until the flap 136 has been folded approximately to the position of Fig. 25. The blade 104 is then retracted while the blade 99 continues to complete the folding of the flap as shown in Figs. 26 and 27. It will be apparent that this retracting of the blades 104 is caused by the relative movement given the shaft 84 by means of the cam path 126 and the toggle mechanism above described. The folded flap then passes beneath the plow 140.

When operating on trailing flaps it is desirable that the blank shall be supported adjacent to both edges of the flaps being folded and, as illustrated in Figs. 28 and 29, two pairs of belts 85 are provided for this purpose at the side margins of the flaps. The belts are supported on wheels 89 and rollers 88 of the nature shown in Fig. 21.

Having thus disclosed my invention what I claim as new and desire to secure by Letters Patent is:

1. A box blank folding machine comprising a pair of carrier belts having opposed reaches for engaging a blank therebetween and feeding it along a predetermined path, a shaft extending across said path, means for rotating the shaft synchronously with the feeding speed of the blank, said path including a portion disposed arcuately and concentrically about said shaft, and means including a blade carried by said shaft for folding about a score line during said rotation of the shaft and passage of the blank through said arcuate portion of the path a foldable flap projecting from the blank longitudinally of said path.

2. A box blank folding machine comprising a pair of carrier belts having opposed reaches for engaging a blank therebetween and feeding it along a predetermined path parallel with the reaches, a shaft extending transversely across said path, means connecting the shaft for rotation synchronously with the feeding speed of the belts, a breaker blade carried by the shaft in position to move with and engage the blank along the score line of a foldable flap projecting from the blank longitudinally of said path, a folding blade carried by the shaft, means for moving the folding blade against the flap relative to the breaker blade and folding the flap about said line and the breaker blade as the blank is carried past the shaft, said path including a portion disposed arcuately about said shaft, and means for supporting and conducting the belts through said arcuate portion of the path, said folding of the flap being effected in said arcuate portion of the path.

3. The machine defined in claim 2 in which the last named means includes a wheel carried by the shaft and having its periphery in supporting contact with the adjacent belt along said arcuate portion of the path.

4. The machine defined in claim 2 in which the last named means comprises a wheel carried by the shaft and an annulus supported for free rotation coaxially on and outwardly of the wheel and having an arcuate portion of its periphery in supporting contact with the concave face of the adjacent belt along said arcuate portion of the path.

5. The machine defined in claim 2 in which the last named means includes a series of freely rotatable rollers disposed along said arcuate portion of the path between the belts and said shaft and in peripheral supporting contact with the concave face of the adjacent belt.

6. The machine defined in claim 2 plus an arm supported by the shaft for pivotal movement on an axis parallel with the shaft, a cam, means on the arm at one side of the pivot cooperating with the cam for pivotally moving the arm, and means for supporting the folding blade on the arm at the other side of the pivot, the folding blade being disposed forwardly of the breaker blade along the path and being adapted to engage and fold a forwardly extending flap on the blank while the breaker blade is in holding engagement with the blank rearwardly of the flap.

7. The machine defined in claim 2 in which a plurality of breaker blades and a like number of folding blades are disposed in uniformly spaced relation about the shaft respectively to cooperate in pairs each comprising a breaker blade and a folding blade to fold the flaps on a plurality of successive blanks in said path during each complete rotation of the shaft, a shaft extending transversely across said path beneath and at one end of said arcuate portion of the path, a wheel carried on the second named shaft, and a plurality of abutments carried by and uniformly spaced about the wheel for lifting the flaps to be engaged by the folding blades.

8. A box blank folding machine comprising a pair of carrier belts having opposed reaches for engaging a blank therebetween and feeding it along a predetermined path parallel with the reaches, a shaft extending transversely across said path, means connecting the shaft for continuous rotation in one direction synchronously with the feeding speed of the belts, a breaker blade carried by the shaft for movement therewith in a circular path concentrically of the shaft and having a free end margin parallel with the shaft and in position to move with and engage the blank along the score line of a foldable flap projecting from the blank longitudinally of said path, a folding blade carried by the shaft for movement therewith in a circular path concentrically of the shaft, and means for moving the folding blade against the flap relative to the breaker blade and shaft and folding the flap about said line and the breaker blade as the shaft rotates and the blank is carried forwardly past the shaft.

9. The machine defined in claim 8 in which a plurality of breaker blades and a like number of folding blades are disposed in uniformly spaced relation circularly and concentrically about the shaft respectively to cooperate in pairs and fold the flaps on a plurality of successive blanks in said path during each complete rotation of the shaft.

10. The machine defined in claim 8 plus a wheel fixed to said shaft, an arm pivoted to the wheel and supporting the folding blade, the last named means including a fixed cam for pivotally moving the arm upon rotation of the wheel with the shaft, and means supporting the breaker blade on the wheel.

11. The machine defined in claim 8 plus a wheel fixed to the shaft, a plurality of arms pivoted to the wheel in uniformly spaced relation about the shaft, and a breaker blade and a folding blade carried by each arm, the last named means including a cam for pivoting the arms to cause relative movement and cooperation of the breaker and folding blades on adjacent arms and effect the flap folding operation.

12. The machine defined in claim 8 plus a pair of wheels in spaced relation and loose on the shaft, a bar extending along the shaft and fixed at its ends to the wheels, means securing the breaker blade to the bar, and cam means for rotatably shifting the shaft relative to the wheels during the flap folding operation.

13. The machine defined in claim 12 in which the breaker blade is adjustable along the bar and said cam means include a fixed cam having successive portions for moving the folding blade into engagement with the blank and for thereafter retracting the folding blade all during rotation of the shaft.

14. The machine defined in claim 12 in which said path includes a portion disposed arcuately about said shaft, and means including said wheels for supporting and conducting two pairs of said belts through said arcuate portion of the path, said folding of the flap being effected in said arcuate portion of the path.

15. The machine defined in claim 14 in which the folding blade is disposed rearwardly of the breaker blade at said arcuate portion of the path and in position to engage a rearwardly extending flap on the blank and fold the flap forwardly while the breaker blade is in holding engagement with the blank adjacent to its junction with the flap.

16. The machine defined in claim 15 in which said cam means includes a toggle embodying a pair of pivotally connected links respectively connected to the wheels and shaft and cooperating with a fixed cam for rotatably shifting the shaft relative to the wheels during rotation of the shaft.

17. The machine defined in claim 8 in which the breaker blade is fixed to and remains immovable relative to said shaft.

18. The machine defined in claim 8 plus a second shaft extending transversely across said path rearwardly of the first named shaft, a wheel on the second shaft, a plurality of pins disposed in uniformly spaced relation about and extending outwardly from the wheel in position to engage and bend tabs on the blanks downwardly prior to the folding engagement of the said flaps by the breaker and folding blades, and a like number of breaker and folding blades carried by and uniformly spaced about the first named shaft.

References Cited in the file of this patent

UNITED STATES PATENTS

| | | |
|---|---|---|
| 782,176 | Robinson | Feb. 7, 1905 |
| 2,112,121 | Sidebotham | Mar. 22, 1938 |
| 2,149,111 | Bergstein | Feb. 28, 1939 |
| 2,268,423 | Rose | Dec. 30, 1941 |
| 2,349,204 | Staude | May 16, 1944 |
| 2,462,513 | Kucklinsky | Feb. 22, 1949 |
| 2,519,111 | Chapman | Aug. 15, 1950 |